(12) United States Patent
Lee (10) Patent No.: US 8,522,674 B2
(45) Date of Patent: Sep. 3, 2013

(54) CULINARY STEAMER

(75) Inventor: Tsao-Chiang Andy Lee, Hong Kong (CN)

(73) Assignee: Tai Yu International Mey, Ltd., Kowloon (HK)

( * ) Notice: Subject to any disclaimer, the term of this patent is extended or adjusted under 35 U.S.C. 154(b) by 582 days.

(21) Appl. No.: 12/311,945

(22) PCT Filed: Sep. 24, 2007

(86) PCT No.: PCT/CN2007/070757
§ 371 (c)(1),
(2), (4) Date: Apr. 20, 2009

(87) PCT Pub. No.: WO2008/049356
PCT Pub. Date: May 2, 2008

(65) Prior Publication Data
US 2010/0024666 A1    Feb. 4, 2010

(30) Foreign Application Priority Data

Oct. 25, 2006    (HK) .................................. 06111787

(51) Int. Cl.
*A47J 37/12*      (2006.01)
(52) U.S. Cl.
USPC ............................................. 99/416; 99/473
(58) Field of Classification Search
USPC .................. 99/48.1, 417, 416, 473
See application file for complete search history.

(56) References Cited

U.S. PATENT DOCUMENTS

| | | | | |
|---|---|---|---|---|
| 119,169 | A * | 9/1871 | Ogden | 126/369 |
| 322,774 | A * | 7/1885 | Armstrong | 126/369 |
| 522,399 | A * | 7/1894 | Beveridge | 126/369 |
| 1,091,636 | A * | 3/1914 | Davenport | 99/417 |
| 2,359,996 | A * | 10/1944 | Kunkel | 269/217 |
| 3,330,608 | A * | 7/1967 | Druger, Jr. | 312/111 |
| 3,364,844 | A * | 1/1968 | Felske | 99/331 |
| 3,365,071 | A * | 1/1968 | Ottinger | 211/153 |
| 3,964,809 | A * | 6/1976 | Wirbilowicz et al. | 312/111 |
| 4,397,298 | A * | 8/1983 | Abell | 126/369 |
| 4,649,811 | A * | 3/1987 | Manganese | 99/417 |
| 4,699,291 | A * | 10/1987 | Prais et al. | 220/319 |
| 4,739,698 | A * | 4/1988 | Allaire | 99/410 |
| 5,573,741 | A * | 11/1996 | Riley | 422/300 |
| 5,638,984 | A * | 6/1997 | Munari | 220/750 |
| 5,706,968 | A * | 1/1998 | Riley | 220/326 |
| 5,957,323 | A * | 9/1999 | Terracciano et al. | 220/574 |
| 6,076,676 | A * | 6/2000 | Dahl | 206/467 |
| 6,450,361 | B1 * | 9/2002 | Mendelson et al. | 220/573.1 |
| 2010/0025407 | A1 * | 2/2010 | Benson | 220/564 |

FOREIGN PATENT DOCUMENTS

| CN | 2855256 Y | * | 1/2007 |
|---|---|---|---|
| CN | 101822490 A | * | 9/2010 |
| WO | WO 9212062 A1 | * | 7/1992 |

* cited by examiner

*Primary Examiner* — Vishu K. Mendiratta
(74) *Attorney, Agent, or Firm* — Rosenberg, Klein & Lee (57) ABSTRACT

A steamer system for culinary use comprises one or more stackable food receptacles (4) having lower surfaces provided with steam-receiving openings, a removable base (12) to which a lower receptacle is releasably securable, and a cover for the uppermost receptacle releasably securable thereto and formed with a carrying handle (34), the receptacles (4), base (12) and lid (14) being securable with releasable clips (20).

4 Claims, 12 Drawing Sheets

CULINARY STEAMER

TECHNICAL FIELD OF INVENTION

The present invention relates to a steamer system for culinary use.

BACKGROUND ART OF THE INVENTION

With steaming being one of the healthiest techniques for cooking food there is growing use of steamers in food preparation. A variety of culinary steamers exist. In the simplest form a steamer comprises a receptacle which fits over a water-containing cooking pot or pan and has a perforated lower surface allowing steam to enter the receptacle, and a lid. It is also well-known to provide such receptacles in a manner whereby several receptacles can be stacked on top of each other. This conveniently allows different foods to be simultaneously cooked in different receptacles.

Steaming appliances are also known which comprise an electric base unit which heats water therein to provide the steam, on which can be fitted a food receptacle or a plurality of stacked food receptacles.

SUMMARY OF THE INVENTION

The present invention is directed to an improved steamer system with additional functionality.

According to the present invention there is provided a steamer system comprising a food receptacle or stack of food receptacles releasably interconnected by first securing means, the or each receptacle provided with steam-receiving openings; a removable base to which the receptacle or a lowermost receptacle is releasably securable by second securing means; and a cover for the receptacle or an uppermost receptacle releasably securable thereto by third securing means and formed with a handle, whereby the steamer system can be carried by said handle.

This arrangement provides a steamer which can, with the base removed, be conveniently used in a steaming operation, and then with the base fitted removed with the cooked food therein and conveniently carried to some other location, such as a place where the food is to be consumed, or placed in a car for travelling to another location, or directly placed in a refrigerator for consumption later on. Alternatively, it might be placed in a microwave oven for re-heating.

The invention is applicable to a structure with only a single food-carrying receptacle, but more advantageously a plurality of food receptacles are provided, adapted to be stacked on each other and with releasable securing means therebetween, a lowermost receptacle securable to said base, and an uppermost to said cover, the securing means taking the form of releasable clips.

In a preferred form the or each receptacle is formed at both lower and upper edges with a flange for engagement with a flange on the adjacent base, cover, or receptacle said clips connecting said flanges.

The clips may take a variety of forms. In one embodiment they comprise members of U-shaped cross-section having opposed fingers between which the adjacent flanges are received. The clips will preferably be formed of slightly resilient material whereby the flanges are tightly gripped therebetween. It may also be arranged that protrusions are formed on one or other of the flanges or the co-operating surfaces of the clips, receivable within detent recesses on the other of the flanges or co-operating surfaces of the clips.

In another embodiment the clips comprise members pivotably mounted on the receptacles and formed with fingers which engage the flange of an adjacent receptacle, cover or base, with the flanges of the adjacent receptacle cover or base formed with a protrusion behind which said fingers engage.

In a further alternative embodiment the engaging flanges comprise aligned openings, and wherein the clips are insertable through the aligned openings and twistable into a locking position. The aligned openings may be of elongate form, the clips end having an insertion end with formations of corresponding elongate form, and at an opposite end a wing-nut like portion for grasping by the user for rotating the clips to a locking position.

A dedicated steam generator, such as one electrical steam generating appliance, may be provided to conveniently receive the stack of receptacles thereon.

BRIEF DESCRIPTION OF THE DRAWINGS

Embodiments of the invention are now described, by way of example only, with reference to the following drawings in which.

MODE OF CARRYING OUT THE INVENTION

Figure 1:
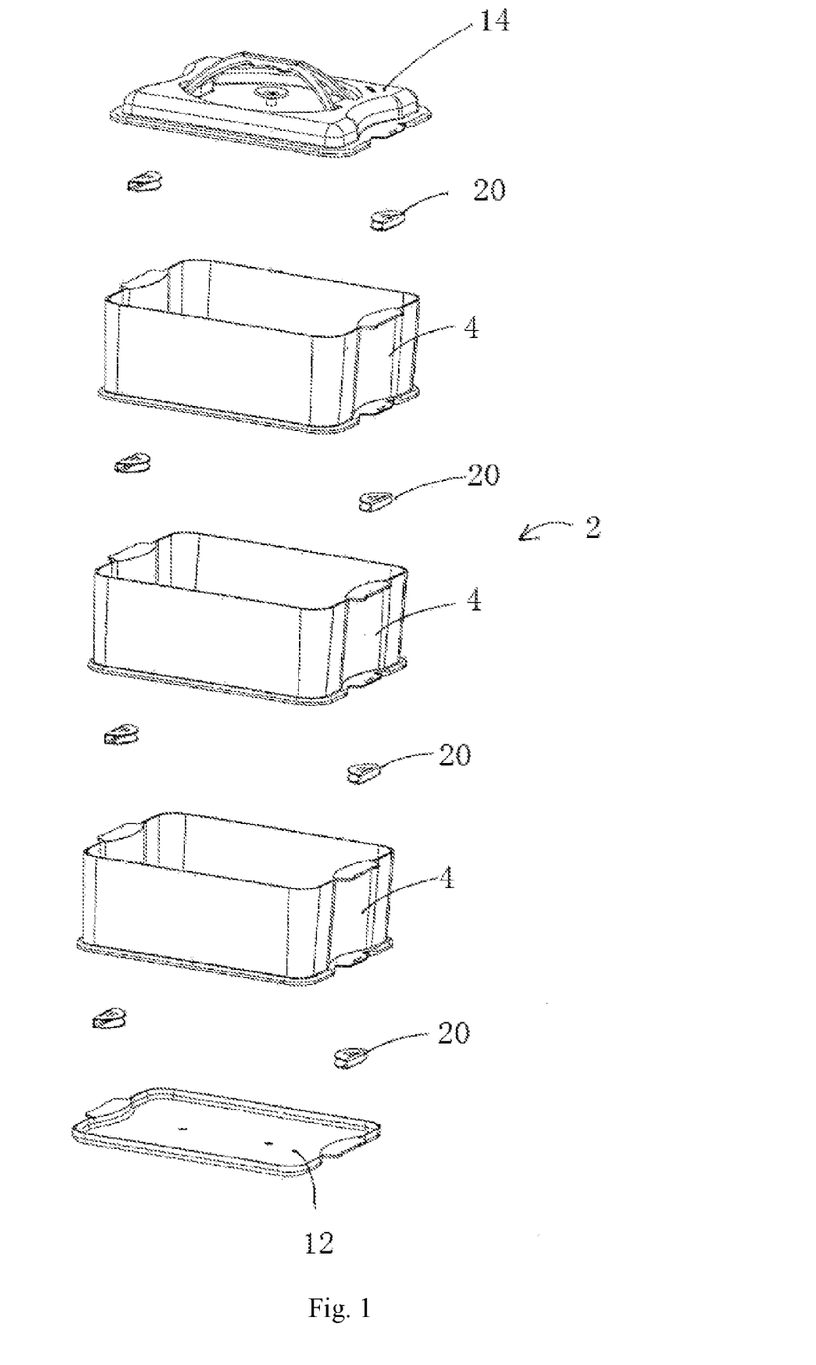
FIG. 1 is an exploded view of a steamer system in accordance with an embodiment of the invention.
Figure 2:
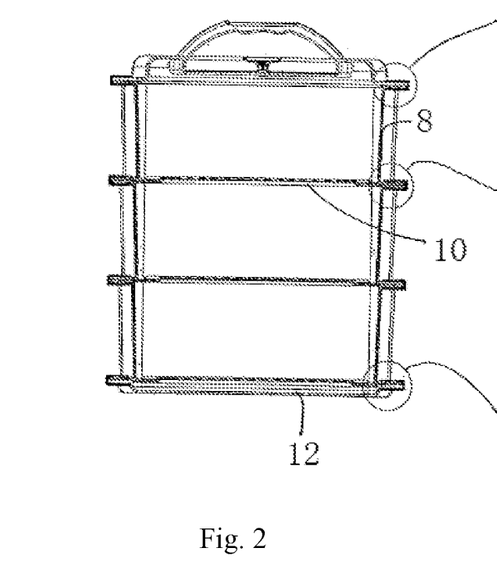
FIG. 2 is a cross-sectional view of the steamer system of FIG. 1.
Figure 2A:
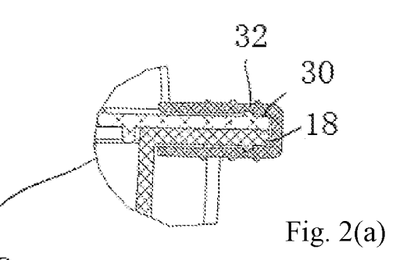
FIG. 2(a), (b) and (c) are enlarged sectional details of parts of the steamer system of FIG. 2.
Figure 5:
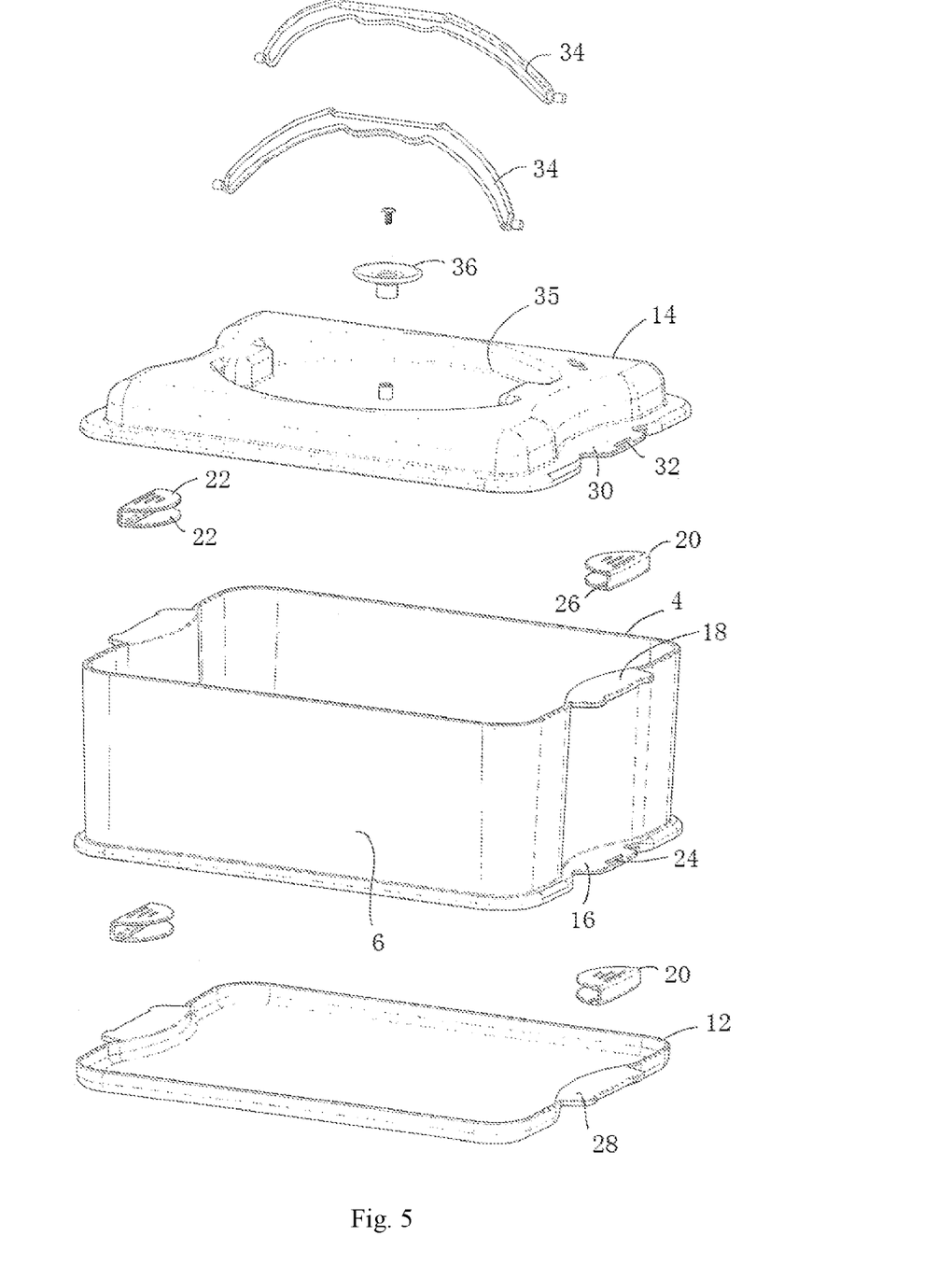
FIG. 5 is an exploded view of the steamer system incorporating a single receptacle.
Figure 6:
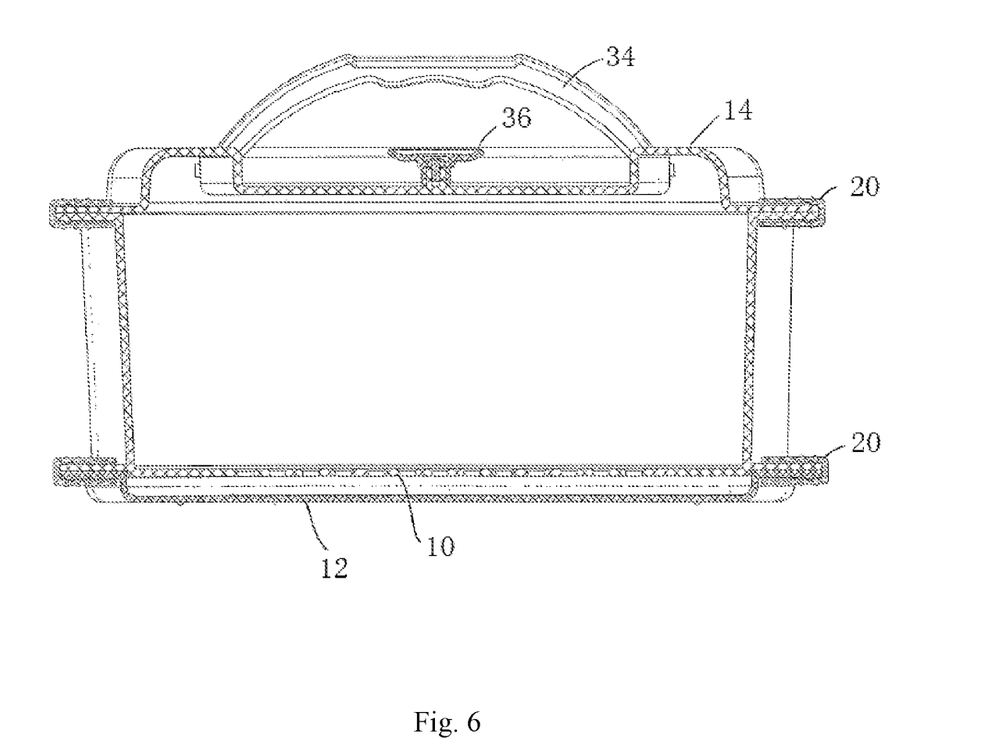
FIG. 6 is a cross-sectional view of the steamer of FIG. 5.

Turning to the drawings, FIGS. 1 and 2 show a steamer system generally indicated 2 according to an embodiment of the invention. The steamer system 2 preferably comprises a plurality of food receptacles 4 each of identical construction (although in its simplest version, as illustrated in FIGS. 5 and 6 the system may include only a single receptacle, as discussed below). In the illustrated embodiment these are of generally rectangular form with sidewalls 6, end walls 8 and a lower surface 10 which is perforated with a large number of openings, whereby during cooking steam may readily enter the receptacles to cook the food therein. It will be appreciated however that the receptacles need not be of rectangular form, but could equally be square or some other shape, provided there is a lower surface and upstanding outer wall. A base 12 is provided which underlies the lowermost receptacle 4, whilst the uppermost receptacle is closed by a cover 14.

Figure 2B:
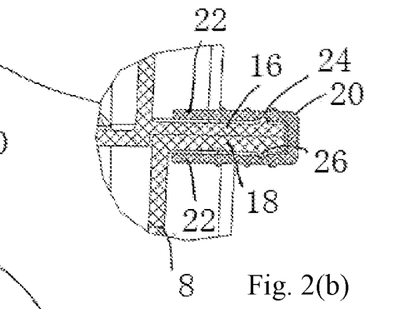
Figure 2C:
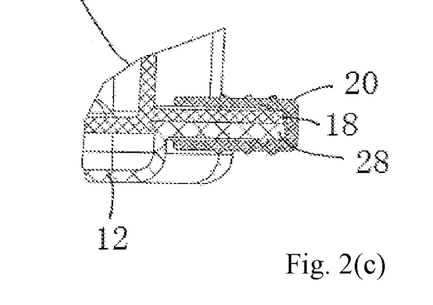

Each receptacle is configured so that it conveniently sits on top of the receptacle beneath it in the stack. More particularly, as best seen in FIG. 2(b) the lower surface 10 of a receptacle is dimensioned to fit just inside the upper opening of a receptacle beneath it. Each receptacle 4 is formed at opposite lower edges of the end walls 8 with an outwardly protruding flange 16, and at an upper rim of the end walls 8 with co-operating flanges 18. When stacked the flanges 16 and 18 abut each other. The receptacles are secured to each other by means of clips 20 which comprise members of U-shaped section with opposed fingers 22 which can be slid onto the abutting flanges 16, 18. The clips are preferably formed of slightly resilient material whereby the opposed fingers 22 can flex slightly relative to each other, and can be dimensioned such that when fitted over the flanges 16, 18 the opposed fingers are urged slightly apart, whereby a tight interference fit is obtained. In order to add to the retention function a detent feature may be provided, as illustrated, the flanges have elongate laterally extending protrusions 24 which fit into corresponding recesses 26 within the inner surfaces of the fingers 22 of the clips 20. The clips can be readily fitted on and removed from the receptacles 4, and when fitted provide a strong, reliable connection between receptacles sufficient to readily support the weight of the several food-filled receptacles.

The base 12 is likewise formed with a pair of flanges, indicated 28, when stacked abutting the lower flanges 18 of the lowermost receptacle 4, and provided with identical retaining clips 20. The flanges 28 can likewise be formed with a detent feature in the form of a protrusion 24 for engaging the recess 26 within the clip 20.

The lid 14 is likewise formed With a pair of oppositely disposed flanges 30, when stacked abutting the upper flanges 16 of the uppermost receptacle 4 and is provided with identical clips 20. The flanges 30 may likewise be formed with the same detent features comprising protrusions 32 for engaging the recess 26.

The lid is additionally formed with a handle whereby it, and the underlying receptacles when secured thereto, can be lifted by the user. As illustrated the lid includes both a carrying handle in the form of a pair of handle members 34 pivotably joined to the lid 14, as well as a knob 36 extending from the lid 14; however, any kind of handle allowing the lid and underlying receptacles to be carried may be used. The pivotably mounted handle members 34 can conveniently be folded down within an upper recess 35 on the lid 14, which is particularly useful for providing a conveniently compact design.

Figure 3:
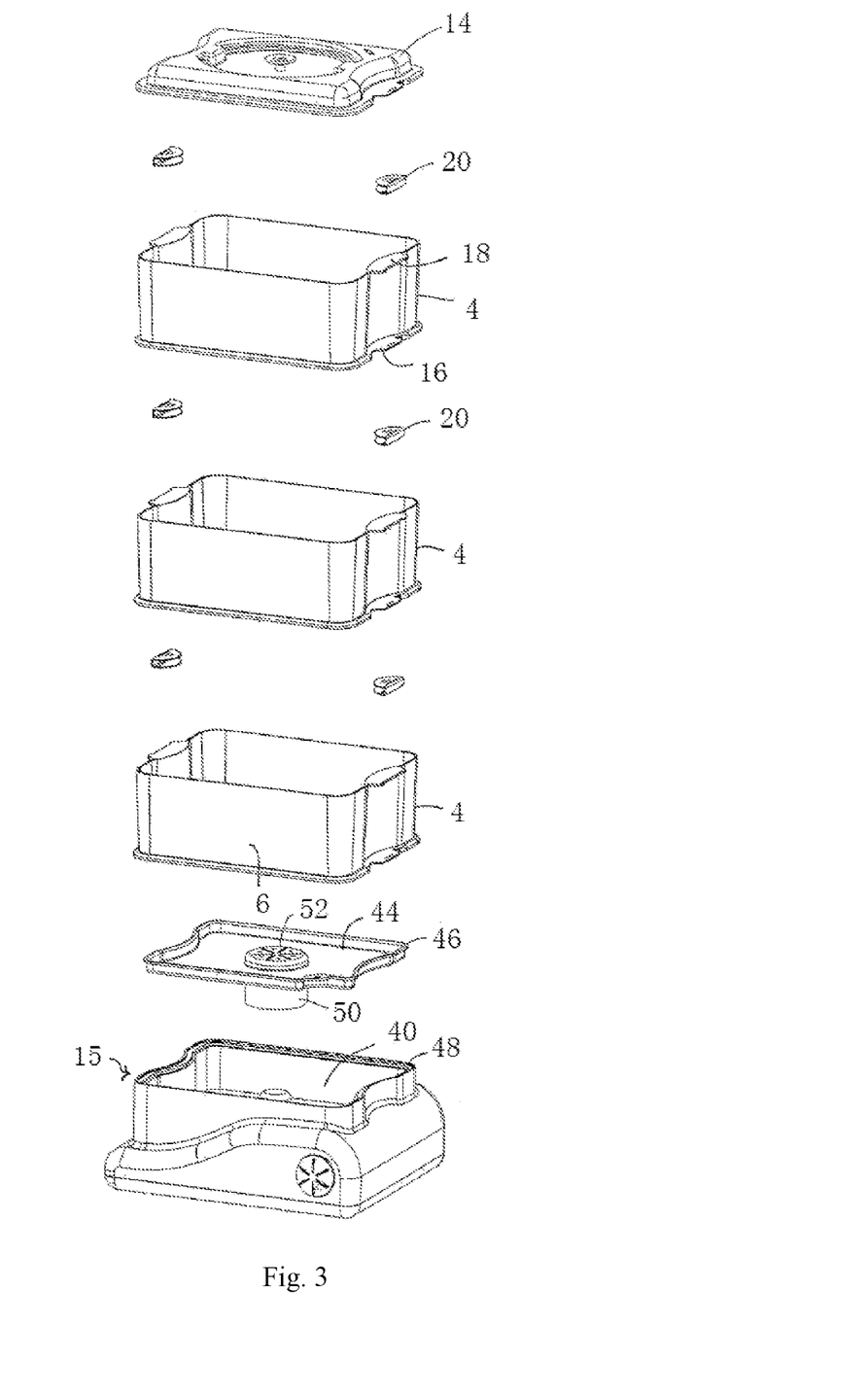
FIG. 3 is an exploded view of the steamer system in a cooking mode.
Figure 4:
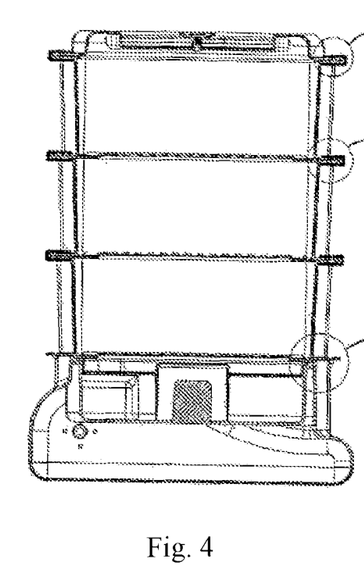
FIG. 4 is a cross-sectional view of the steamer system of FIG. 3.
Figure 4A:
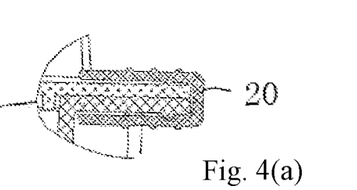
FIG. 4(a), (b) and (c) are enlarged sectional details of the steamer system of FIG. 4.
Figure 4B:
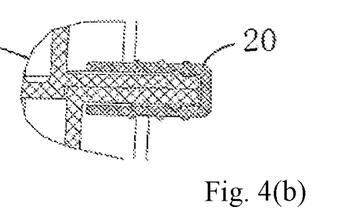
Figure 4C:
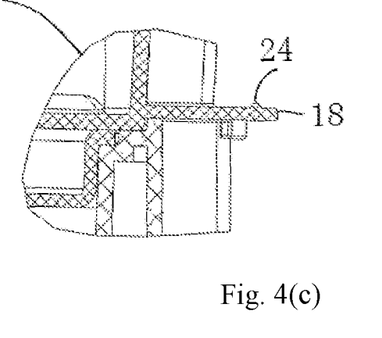
Figure 7:
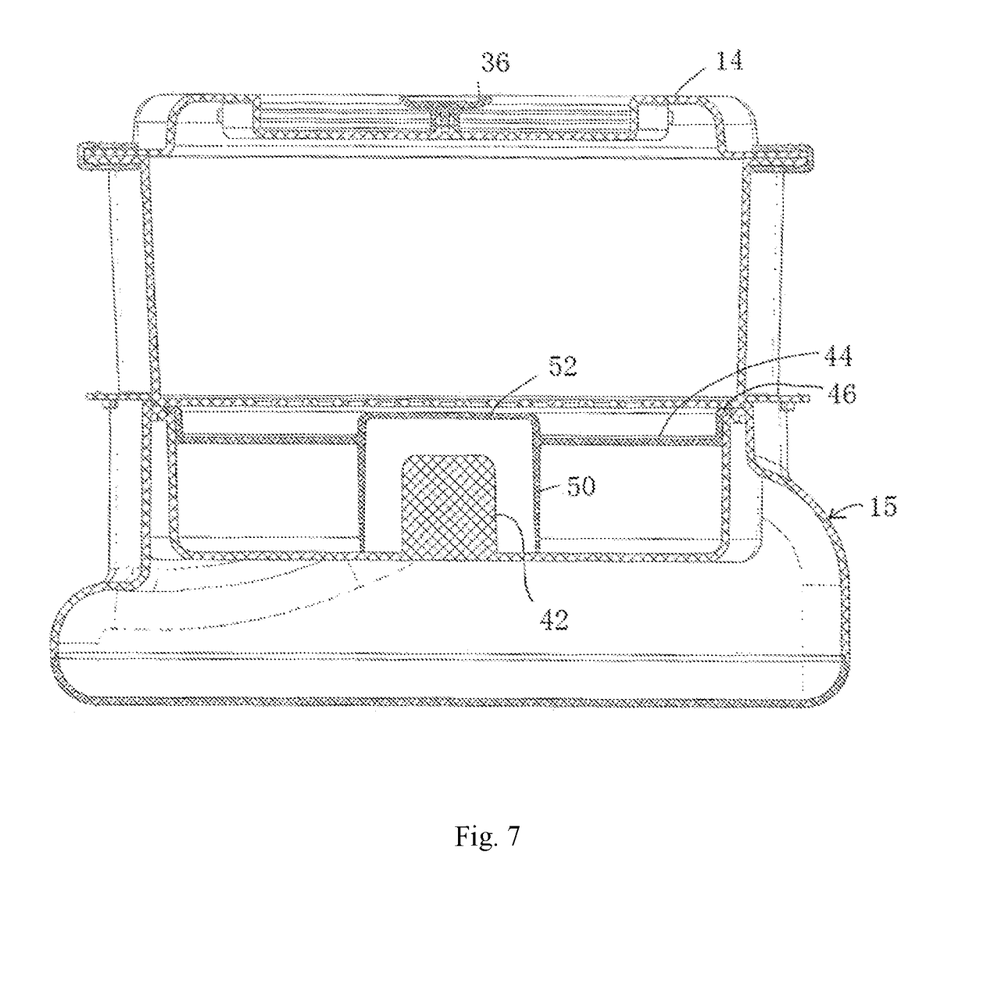
FIG. 7 is a cross-sectional view of the steamer system with a single receptacle, in a cooking mode.
Figure 8:
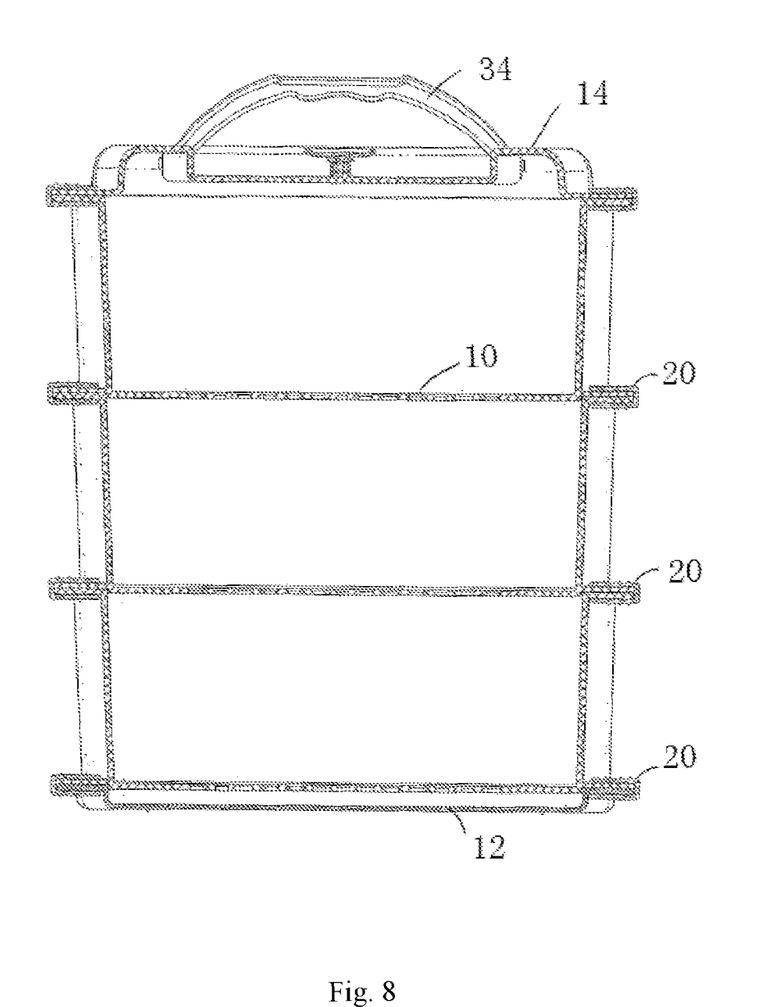
FIG. 8 is a cross-sectional view of the steamer system with three receptacles, in a storage mode.

FIGS. 3 and 4 show the steamer system 2 in a cooking mode with three receptacles 4 utilized, and FIG. 7 with only a single receptacle 4. The steamer 2 is fitted on top of a steam generating appliance which is in the form of a dedicated electric appliance indicated 15. As best seen in FIG. 7 this comprises a housing with a central well 40 in which there is heating element in the form of an electrical resistance heater. A lip 48 surrounding the well 40 is formed with a stepped seat. A removable cover 44 overlies the well 40 having an outer flange 46 which fits in an inner step of the peripheral lip 48 and a central tubular column 50 a lower edge of which rests on the base of the well 40, and an upper end region 52 of which is perforated is seen in FIG. 3. An outer step of the lip 48 defines a step which receives the lowermost receptacle 4.

In use the well 40 is filled with water and the cover 44 fitted thereon. The receptacle or stack of receptacles is positioned to overlie the appliance 15, with the base 12 removed, and the lid 14 fitted to the uppermost receptacle, and the receptacles 4 and lid 14 connected by the clips 20. The water is heated to boiling by the heating element 42, the steam passing through the perforated region 52 in the cover 44 and rising into the overlying receptacle(s) to thereby cook the food in the receptacle(s).

After cooking the receptacle or stack of receptacles can be lifted from the appliance 15 by the knob 36 or handle members 34, and the base 12 secured to the lowermost receptacle, to arrive at the arrangement for example of FIG. 2. The steamer system 2 can be conveniently carried to wherever the food is to be consumed; for example, it might be carried into the garden or backyard if one is heating at home, or even carried directly to the table, or put into the boot of a car for carrying to a picnic or another person's home, all without the need to disturb the cooked food from the receptacle in which it has been cooked.

The combination of steamer system 2 with its receptacles 4, base 12 and lid 14 and dedicated steam generating electrical appliance 15 forms an assembly which can be used conveniently and effectively to provide a steaming function, without access to a hob or stove top. Equally however, the steamer system 2 can however be used with other steam generating means, such as a simple water-filled pan over a hob or stove.

Although the illustrated embodiment shows interconnection of receptacles 4, base 12 and lid by means of abutting flanges and clips 20, it will be appreciated that a wide variety of other releasable connection means may be employed, such as snap-fit interconnections, pivoting latches and a variety of other structures as will be well known to a skilled person.

Figure 9:
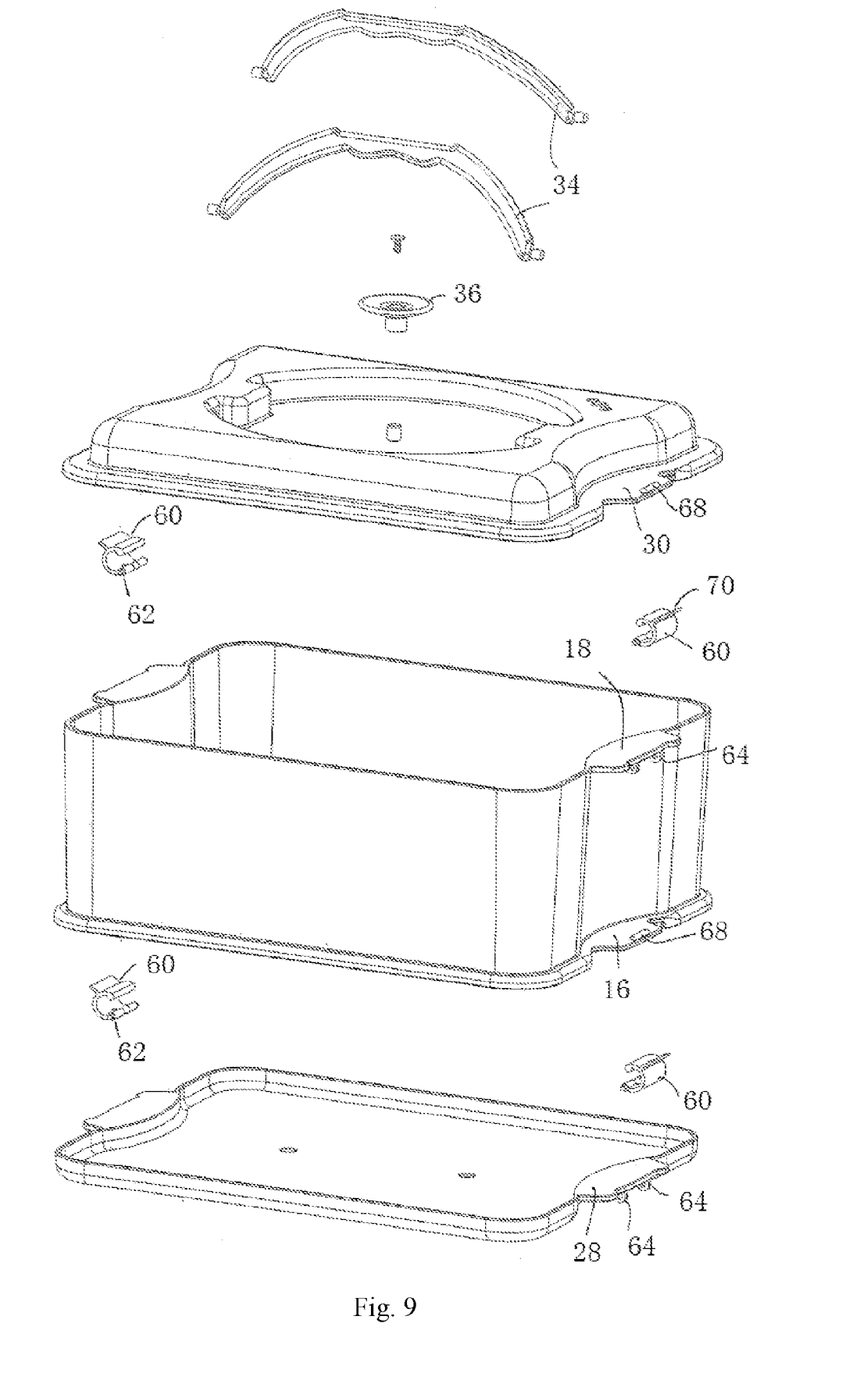
FIG. 9 illustrates a steamer system with a first alternative arrangement of locking clips.
Figure 10A:
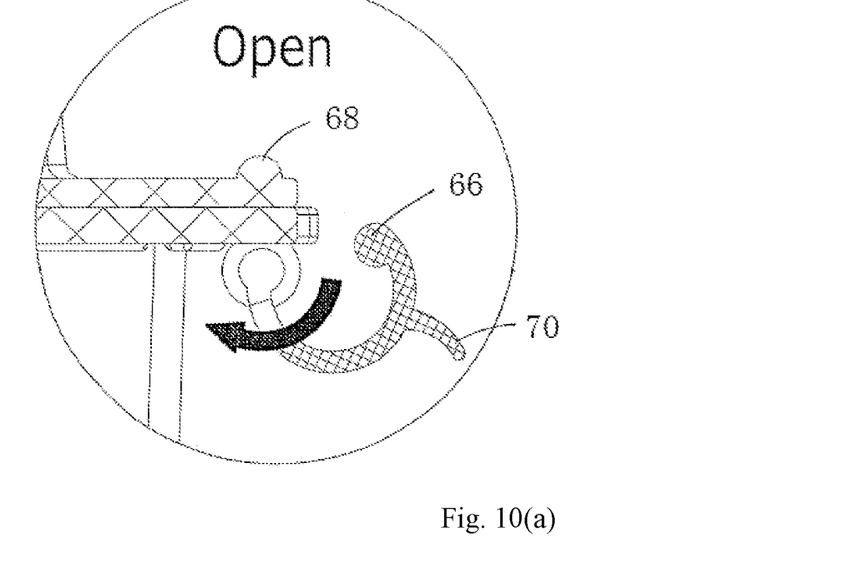
FIG. 10(a) and (b) are enlarged view of the FIG. 2 arrangement showing unlocking and locking respectively.
Figure 10B:
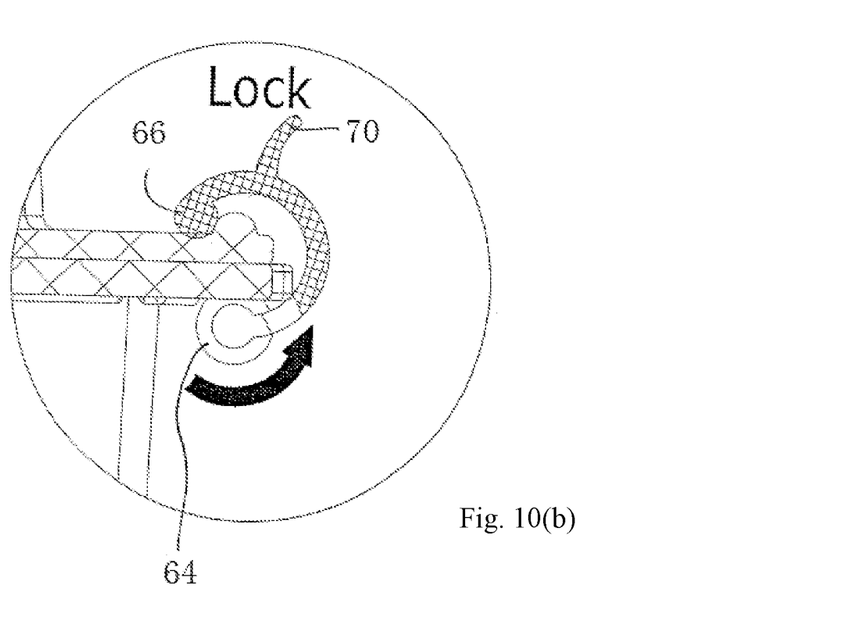

FIGS. 9 and 10(a), (b) illustrate an alternative form of releasable connection where the lowermost flange (18, 28) of each pair of abutting flanges is formed with a pivotably mounted clip 60, mounted by means of oppositely directed pins 62 which fit between loops 64 on the flange underside. The clips 60 have an enlarged finger portion 66 which engage behind protrusions 68 on the flanges 16, 30. Gripping protrusions 70 facilitate their operation. FIGS. 10(a) and 10(b) illustrate respectively the opening and locking actions.

Figure 11:
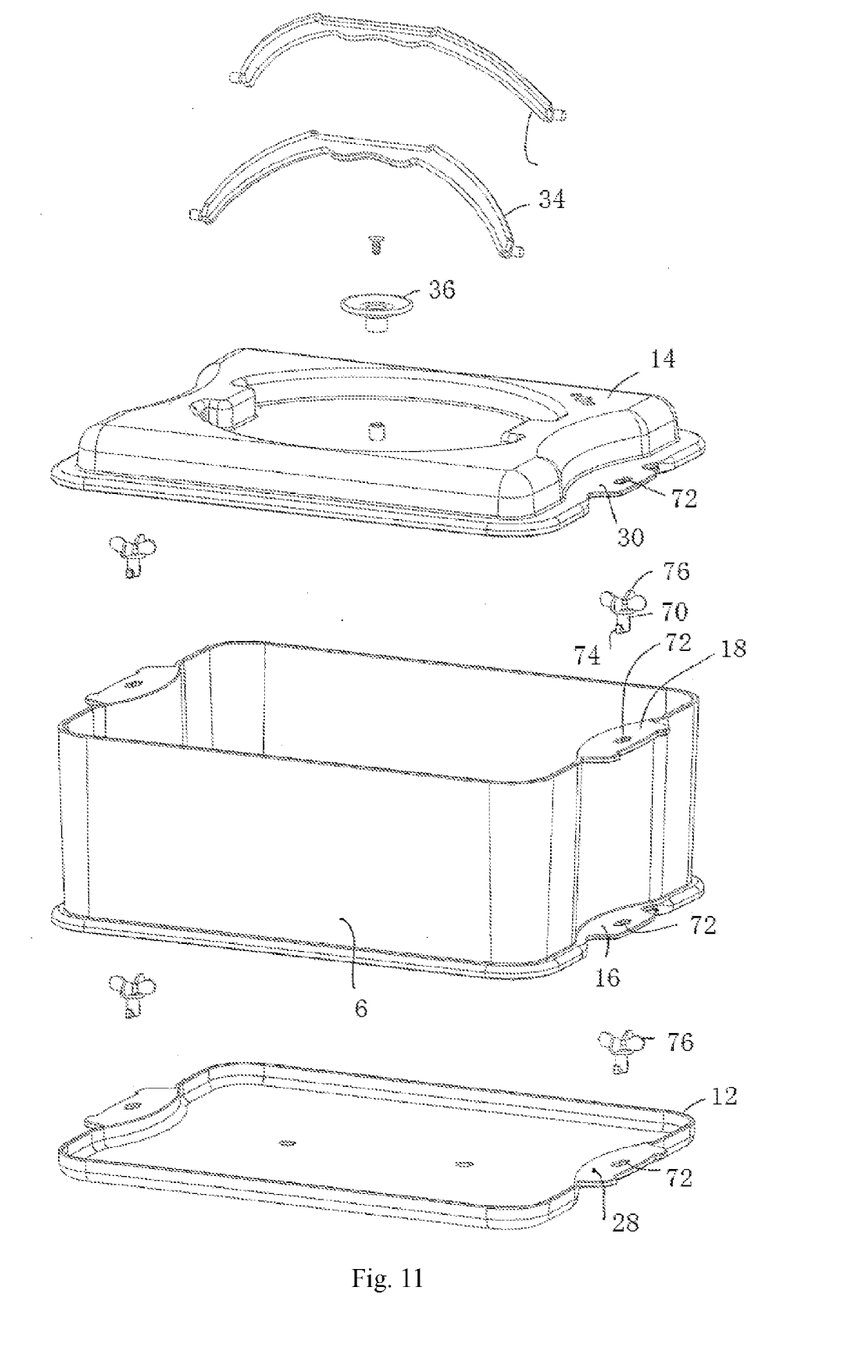
FIG. 11 illustrates a steamer system with a second alternative arrangement of locking clips.
Figure 12:
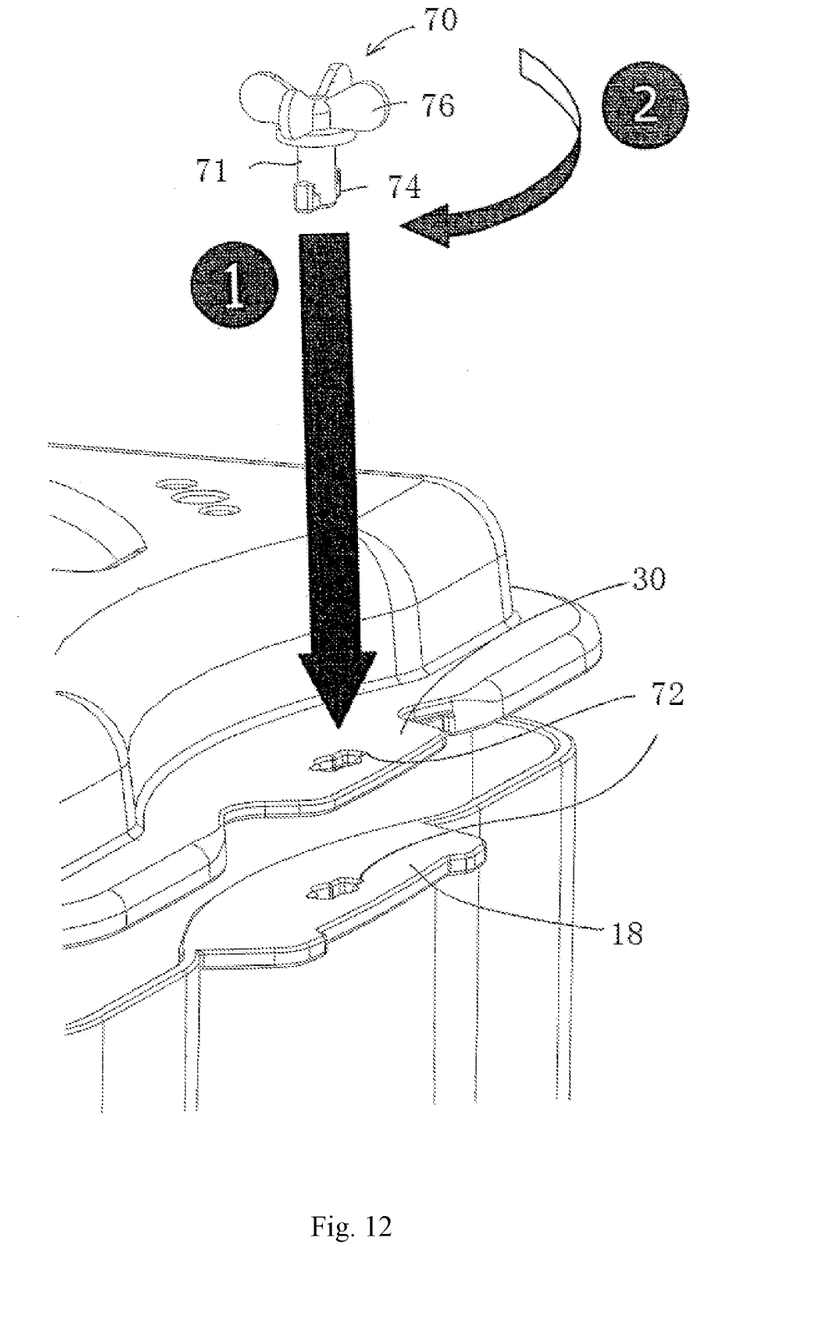
FIG. 12 is an enlarged view of the locking arrangement of FIG. 11.

FIGS. 11 and 12 illustrate a further alternative form of releasable connection employing twistable locking clips 70. In this version the abutting pairs of flanges 28, 16 and 18, 30 are formed with aligned openings 72 of elongate form. The clips 70 have a shaft portion 71 with an insertion end with extending formations 74 of shape corresponding to the openings 72, and an upper wing-nut like portion 76, whereby the clips 70 can be inserted into the aligned openings 72 and grasping the wing-nut like portion 76 twisted by 90° so that the formations 74 engage beneath an edge of the lower opening.

Although FIGS. 9 to 12 show alternative forms of releasable connection providing connections between a base 12, single receptacle 6, and cover 14 it will be appreciated that the same connection is applicable to provide connection between a stack of receptacles 4.

The invention claimed is:

1. A steamer system comprising:
   at least one food receptacle provided with steam-receiving openings and having a pair of flanges laterally extending from opposing sides of each of an upper portion and a lower portion thereof;
   a removable base having a pair of flanges laterally extending from opposing sides thereof, the pair of flanges of the removable base being disposed contiguous with the pair of flanges on the lower portion of the at least one food receptacle;
   a cover having a pair of flanges laterally extending from opposing sides thereof, the pair of flanges of the cover being disposed contiguous with the pair of flanges on the upper portion of the at least one food receptacle, said cover being formed with a handle on a top side thereof for carrying the steamer system; and a plurality of clips, a pair of said clips each detachably engaging and longitudinally capturing an adjacent pair of the contiguous flanges of the base and the at least one food receptacle for releasably securing the base to the at least one food receptacle when longitudinally stacked one with respect to the other, and another pair of said plurality of clips each detachably engaging and longitudinally capturing an adjacent pair of the contiguous flanges of the cover and the at least one food receptacle for releasably securing the cover to the at least one food receptacle when placed longitudinally thereon;

wherein the said adjacent pair of said contiguous flanges engaged by said clips include aligned openings, and wherein the clips are insertable through said aligned openings and twistable into a locking position.

2. The steamer system according to claim 1; wherein the aligned openings are of elongate form, the clips end having an insertion end with formations of corresponding elongate form, and at an opposite end a wing-nut portion for being grasped by the user in order to rotate the clips to a locking position.

3. The steamer system according to claim 1; wherein said base contains a steam generator mounted therein.

4. The steamer system according to claim 3 wherein the steam generator includes an electrical steam generating element.

* * * * *